United States Patent Office 3,780,181
Patented Dec. 18, 1973

3,780,181
PREPARATION OF ACTIVE DRY YEAST
William E. Trevelyan, Epsom Downs, England, assignor to The Distillers Company (Yeast) Limited, Morden, Surrey, England
Continuation-in-part of application Ser. No. 78,304, Oct. 5, 1970, which is a continuation-in-part of application Ser. No. 699,781, Jan. 23, 1968, both now abandoned. This application Sept. 5, 1972, Ser. No. 286,133
Claims priority, application Great Britain, Feb. 18, 1967, 7,861/67
Int. Cl. A23j 1/18; C12c 11/32
U.S. Cl. 426—18                    11 Claims

ABSTRACT OF THE DISCLOSURE

Active dry yeast is prepared by continuously feeding crumbly yeast into a mill containing a high speed rotor wherein the yeast is disintegrated to a particle size less than 1.7 mm. predominantly by air turbulence without substantial breakdown of the yeast cells. Thereafter, the disintegrated yeast is dried to a dry matter content of at least 92%.

---

Figure 1:
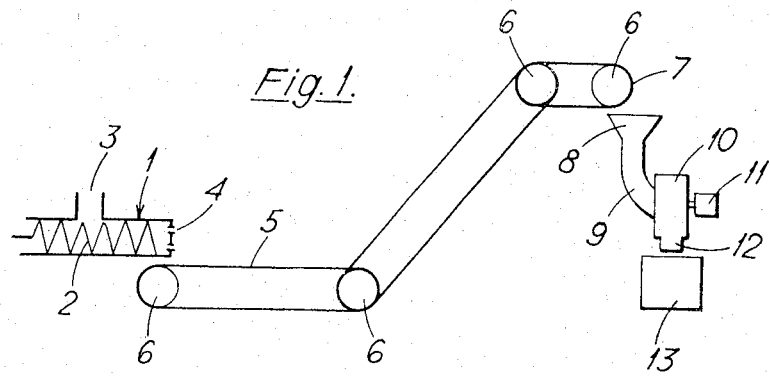

This application is a continuation-in-part of my application Ser. No. 78,304, filed Oct. 5, 1970, now abandoned, which is, in turn, a continuation-in-part of my application Ser. No. 699,781, filed Jan. 23, 1968, now abandoned.

It is well known that active dried yeast can be made by drying moist yeast, for example having a dry matter content of 25 to 40%, to a dry matter content of 92% or more. Although active dried yeast can be stored more easily without loss during storage of activity than moist yeast it is unfortunately a fact that upon reconstitution the activity of the dried yeast is often not very satisfactory. Another disadvantage of dried yeast is that it generally has to be reconstituted by soaking in water before it is mixed with the flour to form a dough for baking.

The most common processes for making active dried yeast have involved comminuting moist yeast under compression and then drying the particles thus obtained. The comminution has usually been effected by extruding the moist yeast through one or more orifices to form a material resembling spaghetti and then cutting the extruded strings of yeast with blades or allowing them to break under gravity into shorter lengths. The moisture content of the yeast that was extruded has varied according to the skills and equipment available to the operator. Many years ago the dry matter content of the yeast to be extruded was as low as 25% but more recently it can be considerably higher, for example 35%. The particles of yeast thus obtained have customarily been fairly large, for example having a diameter of 3 to 8 millimeters although it has been possible to obtain smaller particles. However such smaller particles have only been obtained previously by either forcing the moist yeast through very small orifices or by chopping it with knives into very small particles, or both. Accordingly the production of such small particles has always been associated with the application of considerable compression to the yeast.

After the particles have been obtained they have been dried by a variety of methods. Commercially probably the most common method has been to dry the particles in drum dryers, as a result of which the particles are rolled into substantially spherical particles having a hard surface that appears, to the eye, to be non-porous. Tray drying of the particles has also been proposed. Again, after drying, the particles have a fairly hard surface. All such particles require reconstitution in water prior to mixing with flour.

Typical of processes in which tray drying is used is the process described by Hixson in U.S. specification No. 1,420,630 and the process described by Brown in U.S. specification No. 1,694,807. Hixson describes that the drying is preferably conducted for 18 hours and that the yeast is preferably comminuted to pieces from 2 to 25 cubic millimeters in volume, comminution being by extrusion and chopping with knives. In order to promote uniformity of drying throughout each tray the particles in each tray were stirred during drying, and this tended to compress them into aggregates.

A very different process is described by Klein in U.S. specification No. 1,420,558. In this yeast is chopped in a closed apparatus by a cutting device into a finely divided state and the yeast is then carried through a curved duct and into a container of complex design including several compartments in a current of air while it is being dried, and is collected in the container. This process is unsatisfactory since, inter alia, the transportation and drying of yeast within the apparatus illustrated by Klein would incur substantial practical difficulties because while yeast is being dried through a moisture content of the order of 50% it passes through a very sticky phase and so the drying yeast would stick to the apparatus and clog it. So far as I am aware this process has never been used commercially.

More recently, Johnson in U.S. specification No. 2,919,-194 proposed that active dried yeast should be made by forming a suspension of yeast in an oil and then removing the oil. He forms the suspension by, for instance, dispersing the yeast in corn oil in a Waring Blendor. Unfortunately, it is extremely difficult to remove the oil from the yeast without damaging considerably the properties of the yeast and again this process has not, so far as I am aware, been found to be acceptable commercially despite the fact that in theory the process should have worked sufficiently well to produce yeast particles that were so fine that they could be reconstituted merely by mixing with flour, i.e. without any preliminary soaking in water.

It is an object of the invention to provide an improved process for the production of active dried yeast, and in particular for the production of active dried yeast of improved properties.

According to the invention active dried yeast is made by a method in which crumbly yeast is fed continuously into a mill through which an excess of air is passed and is disintegrated in the mill, without any substantial breakdown of the yeast cells themselves, to a powder predominantly by air turbulence in the mill, the powder is continuously carried out of the mill entrained in a stream of air, is separated from the air stream and is then dried to a dry matter content of at least 92%, the drying being conducted in the substantial absence of any force tending to compress the powder at least until the dry matter content exceeds 70%.

A characteristic feature of the invention is that during the conversion of the yeast into very small particle size the yeast is not subjected to any significant compression, as it is in all the processes I describe above for the production of small particles, but is instead subjected to what can be termed disintegration or even aeration. Accordingly, instead of the product having a dense surface structure it has a very light and porous surface structure.

Another advantage of the invention is that it is carried out continuously, the yeast being fed into and taken out from the mill continuously. Accordingly the difficulties that are inherent in any batch process and which are similar to those necessarily incurred in the process of Klein described above, namely the considerable risk of yeast accumulating and clogging the apparatus, are avoided. If yeast does clog the apparatus then, in addition to being very inconvenient, this results in compression of the yeast particles and this detrimentally affects the final properties of them.

The method is carried out continuously in the sense that the yeast is gradually fed into the mill and is carried out from the mill substantially immediately upon its disintegration, whereas in a batch process all the yeast would have been fed into the mill, would have been subjected to chopping in the mill, and would then all have been removed from the mill after the chopping is completed. However in some instances it may be desirable only to operate the continuous process for a few minutes at a time, although in practice it will usually operate for several hours or longer without interruption. Whenever the process is discontinued the air supply will continue to be passed through the mill after the supply of yeast to the mill has been terminated, in order to ensure that all the yeast is carried out of the mill.

The yeast that is fed to the mill must be in a crumbly state. In practice this usually means that the dry matter content should be at least, say, 28 or 29%, and preferably at least 30% although it is possible to operate at lower dry matter contents, for example 27%, if the yeast is treated in known manner to render it crumbly. Thus, for example, it is known that if extra-cellular water is removed from the yeast the yeast will be more crumbly, at a given dry matter content, than otherwise. Extra-cellular water can be removed by the use of dehydrating additives such as sodium chloride. Preferably the crumbly yeast has a dry matter content of from 30 to 40% when it is fed into the mill.

The crumbly yeast is preferably fed into the mill in particulate form, and the particles can be made in any convenient method. For example they can be made by comminuting compressed yeast, for example having a dry matter content of 30 to 40%, or less if the yeast has been treated with a dehydrating agent. Thus comminution can be effected by extruding a cake of compressed yeast through a bundle of orifices to form strings which conveniently are subdivided into particles by being allowed to fall onto a surface. This surface may be a moving belt which carries the particles to the mill. The particles fed to the mill can be quite large, for example most of them having a size of from 3 to 8 millimeters in diameter and even larger particles, for example up to 2 centimeters, or smaller ones, for example down to 1 millimeter, can be fed to the mill.

In the mill a predominant amount of the disintegration is brought about by the air turbulence in the mill. The mill can merely be a microniser in which all disintegration is brought about by air turbulence. Thus, for example, the mill may comprise a cylindrical chamber having a number of inlets by which air is introduced tangentially into the mill under high velocity. Preferably, however, there is a rotor in the mill and so some disintegration of the yeast may occur as a result of impact with the rotor. I believe, however, that most at least of the disintegration occurs as a result of the air turbulence and not as a result of impact with the rotor. The disintegration is always effected by the application of high shear to the particles and, as a result of the effect of the air in the mill, is accompanied by aeration rather than compression of the yeast.

When there is a rotor in the mill it must rotate at high speed, for example at least 2,000 revolutions per minute and often considerably more, for example at least 5,000, at least 8,000 or even 12,000 revolutions per minute. Conveniently the diameter of the rotor is only slightly less than the diameter of the mill. For example the mill may comprise a cylindrical chamber and the diameter swept by the rotor blades may be at least 75% of the diameter of the chamber.

Conveniently the air and yeast are fed into the cylindrical chamber at a position substantially on the axis of the chamber, the rotor blades being pitched so as to suck the air into the chamber with the yeast. There is an outlet from the chamber, preferably in the base of the chamber, at a position through which the air is expelled carrying the yeast. In a preferred mill the mill chamber is cylindrical with its axis horizontal, air and chopped yeast are fed into the mill at a position at one end of the chamber on the axis of the cylinder and an outlet leads from the bottom of the chamber. This outlet is normally quite large and may occupy a substantial part of the total wall area of the lower half of the cylinder, i.e. it may be provided by cutting away a substantial part of the wall of cylindrical chamber.

By appropriate design of the mill and by appropriate selection of the operating conditions of the mill it is possible to select appropriately the size of the particles leaving the mill. Generally substantially none of the particles are greater than 1.7 mm. in diameter and preferably substantially all the particles have a diameter in the range 0.1 to 1 mm.

The amount of air supplied to the mill is not critical and it is merely sufficient that there should always be a sufficient excess of air that the yeast is entrained by the air in the mill and is carried out of the mill entrained in the air, the risk of blockages in the mill thus being reduced or eliminated. Generally, to avoid the risk of the yeast powder falling out of the air stream the stream of air and yeast is lead out of the mill through an exit that faces vertically downwards and the yeast is normally then immediately separated from the air stream.

The yeast powder occupies a very much greater volume than the volume occupied by the starting yeast. For instance, the volume is usually at least twice, and often at least 2.7 times and most usually at least three times the volume of a compressed cake of the same yeast of the same dry matter content.

After separating the yeast powder from the stream of air in which it is carried out of the mill it is dried. Any convenient method of drying may be used. For example the yeast can be spread in trays and tray dried in an oven.

The drying is conducted at least until the dry matter content is at least 92% and preferably is conducted until the dry matter content is at least 95% or more. For example it may be 95 to 97.5%.

It is important that the drying is conducted in the substantial absence of any force tending to compress the powder at least until its dry matter content exceeds 75%. While the powder is still in the crumbly state, for example having a dry matter content below 40%, the application of some compression to the powder is acceptable and may occur when the powder is being collected from the mill and spread into trays. Any aggregation between the particles of the powder is very weak and the aggregates can readily be broken either before drying or, more usually, after drying simply by, for example, the action of sieving. However during the early stages of drying, for example when the dry matter content is increasing from about 40% to about 75% the particles become very sticky and if any compression is applied to them, for example if they are stirred in the trays by a mechanical mixer, series aggregation of the particles occurs.

Conveniently tray drying is conducted in an oven in which there is a recirculated stream of warm air. Preferred temperatures for the incoming air are from 20 to 60° C., most preferably 32 to 54° C. and the rate of air circulation is preferably from 50 to 400 liters of air per minute per kilogram of yeast. Although the air temperature may be quite high it is important that the yeast temperature should be kept as low as possible and so the higher the temperature of the air the faster should the yeast move through the drier and therefore the shorter should be the duration of drying.

The relative humidity of the air would also affect the rate of drying and so should be selected appropriately. For example during the final stage of drying the relative humidity should preferably be less than 45% and most preferably less than 35% depending upon the temperature selected. Conveniently the air entering the dryer has a dew point of at least 16° C. below that of the air leaving the dryer.

After the yeast has been dried to a dry matter content of at least 92% it may be sieved to remove large particles and this sieving has the effect of breaking many of the larger particles into smaller ones. If additional comminution of large particles is required the coarse fraction from the sieving, or the entire dried powder, may be subjected to any convenient method of comminution. A particularly simple method of comminution is to pass the dried powder through the same mill as was used for disintegrating the crumbly yeast. Such comminution may then be followed by a sieving operation. The substantial proportion of the final powder obtained by the process, optionally after any comminution step, will normally have a diameter less than 0.5 mm. and conveniently therefore the final step of the process may involve sieving through a sieve that removes any particles that are above 0.5 mm. in diameter. Preferably, the particle size is less, for example the sieve used being one that removes particles above 0.35 mm. in diameter.

The dried yeast obtained by the invention can be stored in a dry atmosphere even at elevated temperatures without substantial deterioration on storage. It can be reconstituted before use by soaking but preferably either by exposure to an ambient humid atmosphere, for example having a humidity of about 33% at 20° C., or by being mixed with an excess of flour, which as used for baking usually has a water content of about 13 to 15%, whereupon a slow rehydration occurs by the interchange of water between the flour and the yeast. A dough is formed by mixing water and it is found that the yeast then has good activity. The dough is subsequently baked to form a baked product.

Advantages of the invention additional to those discussed already are that substantially all the yeast subjected to drying is either directly usable or can be easily comminuted into a usable form. Also disintegration is effected without the yeast cells themselves being damaged or subjected to any substantial breakdown, whereas in some prior processes involving fine comminution of a yeast cake damage to the yeast cells themselves can easily occur.

Any strain of yeast suitable for forming active dried yeast may be used as the starting material in the invention. It may have, for example, a nitrogen content of at least 7%.

The following is an example of the invention.

A yeast cake having a dry matter content of 31.7% was obtained from a yeast factory where it had been propagated in an aerated molasses medium. The yeast cake was one that was suitable for use in the manufacture of spherical pellets of active dried yeast on a commercial scale. It had a nitrogen content of 7.2% and a phosphorous content of 2.1% (as $P_2O_5$) calculated on a dry matter basis.

The yeast cake was then granulated in an apparatus as shown in the accompanying drawings. In these:

FIG. 1 is a diagrammatic illustration of the apparatus while

Figure 2:
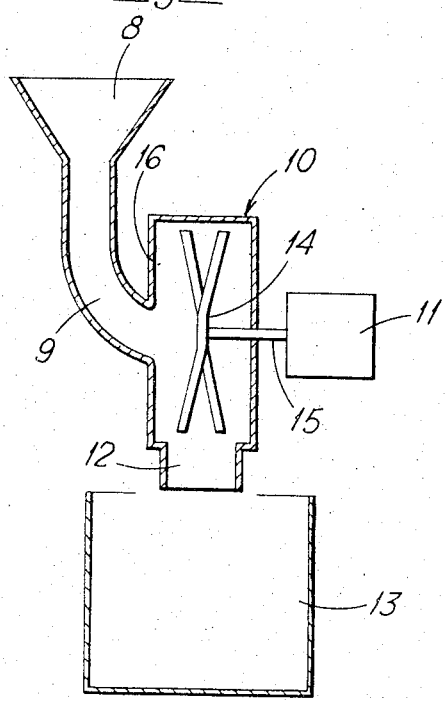

FIG. 2 is a section of part of the apparatus. The apparatus comprises an extruder 1 having a screw 2 by which yeast introduced through an inlet 3 is forced through orifices 4. After extrusion through the orifices it falls onto an endless conveyor 5 which passes around and over suitable guide rollers 6 to the point 7 where the yeast drops off the belt into a hopper 8. A duct 9 leads from the hopper 8 to a mill 10 powered by an electric motor 11 and having an outlet 12. This outlet opens vertically downwards over a receptacle 13.

Referring to FIG. 2, the mill 10 comprises a cylindrical chamber 16 containing a four-bladed rotor 14 mounted on a shaft 15 that is coaxial with the chamber and with the inlet from the duct 9. In a typical example the chamber 16 may be 8" in diameter and each of the blades of the rotor 3.75" in radius.

In the example the orifices 4 in the extruder have a diameter of 5 mm. and yeast was extruded through these as strips which broke and fell as pieces of irregular granular shape onto the belt 5. They were carried on the belt up to the hopper 8 and were fed into the mill 10, this being a Cristy and Norris 8" diameter beater mill that rotates at 8,000 r.p.m. Air was continuously sucked into the mill through the duct 9 and the yeast was disintegrated in the mill and was blasted out of the mill, entrained in air, through the outlet 12. It was collected in a container 13 and was then tipped into trays. Alternatively it can be collected direct in trays.

The trays were passed into a drying oven having controlled air temperature and relative humidity of 45° C. and 28% respectively and are dried in the oven for 4½ hours. The trays were then taken out of the oven and the yeast was cooled in a sealed container and was then sieved through a sieve that retained all particles above 0.35 mm. in diameter. The dry matter content of the sieved product was about 95%. Its mean particle size was 0.225 mm. in diameter.

The sieved product was packed in sealed containers and after storage could be mixed directly with flour, and then with water to form a dough, without previous reconstitution, and the dough then baked.

In this process the volume of the yeast particles in the container 13 was found to be 2.71 times the volume of the yeast cake supplied to the extruder through the inlet 3, and the volume after drying was 0.66 times that of the original yeast cake and the weight was about one third of the original cake. The product was a fine, free flowing powder the particles of which could be seen by the eye to be of an irregular shape and to have a porous nature.

As comparisons, a similar cake was formed into particles a substantial proportion of which had a size range of from 2 cubic millimeters to 25 cubic millimeters in volume by (1) extruding the cake through a perforated plate of suitable size and (2) chopping the cake with a household vegetable chopper having sharp knife edges. These are processes similar to those described in U.S. specification No. 1,420,630. In each instance the product was sieved and the fraction having a size range of from 2 cubic millimeters to 25 cubic millimeters was retained. This was then dried in the same way as in the example of the invention. In each instance the product before drying had a volume about 1.76 times that of the original cake and after drying a volume of about 0.44 times that of the original cake. In each instance the final product had a hard surface. It was found impossible to obtain a satisfactory dough by mixing the product direct with flour and instead the product had to be reconstituted with water before they could be wet mixed with flour.

Tests have been conducted comparing the porous product of the example of the invention, referred to in the tests as A, the product obtained in the comparative test by extrusion, referred to as B, and the product obtained in the comparative test by chopping, referred to as C, under various drying conditions, with and without raking of the trays during drying to various final moisture contents. The fermentometer value, the Stephan proof time and the American (high sugar) proof time were measured. The fermentometer value is the number of milliliters of carbon dioxide evolved after reconstituting the yeast in water and then adding flour under standard conditions. The Stephan proof time is the time required for a dough to be raised to a specific height in an automatic dough making machine. The American (high sugar) proof time is the time required for a dough, typical of an American bread recipe, to be raised to a specific height. The results are given in the following table:

| Product | Drying Temp. (° F.) | Drying Time (hrs.) | Baked during drying | Product size used for testing (microns) | Mean particle size (microns) | Loss of product during drying (estimate) | Percent $H_2O$, final product | Wet-mix 1st day F.V. (mls.) | Dry-mix 1st day F.V. (mls.) | Stephan proof time (mins.) | American (high sugar) proof time (mins.) |
|---|---|---|---|---|---|---|---|---|---|---|---|
| A 1 | 105 | 4 | No | <350 | 225 | None | 5.8 | 94 | 98 | 60 | |
| B 1 | 105 | 5½ | No | 1,000-2,000 | 1,210 | ___do___ | 7.4 | 112 | 67 | 88 | |
| A 2 | 60-105 | 19½ | Yes | <350 | 225 | Approximately 5% | 6.2 | 109 | 104 | 48 | 60 |
| C 2 | 60-105 | 19½ | Yes | 1,000-2,000 | 1,350 | None | 8.1 | 114 | 48 | 138 | 168 |
| A 3 | 100 | 3½ | Yes | <350 | 225 | Approximately 5% | 10.0 | 118 | 100 | 55 | 61 |
| C 3 | 100 | 4 | Yes | 1,000-2,000 | 1,340 | None | 9.9 | 115 | 42 | 101 | 119 |

It is apparent from this that the product of the example consistently gave better results in dry mix processes than any of the other products even when the trays were raked, and that best results were given when the trays were not raked.

I claim:

1. A method of making active dried yeast, which comprises continuously feeding crumbly particulate yeast having a dry matter content of 27 to 40% and a particle size of 1 mm. to 2 cm. into a mill, said mill having a substantially cylindrical milling chamber, an inlet substantially on the axis of the chamber and an outlet leading from the cylindrical wall of the chamber, and a rotor mounted on a shaft coaxial with the milling chamber for high speed rotation, the blades on the rotor being so pitched that upon rotation of the rotor air is drawn in through the inlet and expelled through the outlet, continuously feeding an excess of air through said mill, disintegrating yeast in the mill, without any substantial breakdown of the yeast cells themselves, predominantly by air turbulence in the mill, to form a disintegrated yeast having a particle size less than 1.7 mm. and a volume per unit weight at least twice the volume per unit weight of a compressed cake of the same yeast of the same dry matter content, the rotor being rotated at a speed of at least 2000 r.p.m. during said disintegration, continuously carrying the disintegrated yeast out of the mill entrained in a stream of air substantially immediately upon formation, separating the disintegrated yeast from the air stream and drying the separated yeast to form a powder having a dry matter content of at least 92%, the drying being conducted in the substantial absence of any force tending to compress the powder at least until the dry matter content exceeds 75%.

2. A method according to claim 1 in which the crumbly yeast fed into the mill is a particulate yeast the particles of which predominantly have a particle size of from 3 to 8 millimeters in diameter.

3. A method according to claim 1 in which the milling chamber comprises a substantially horizontal cylinder having an inlet substantially on its horizontal axis and an outlet from the bottom of the chamber.

4. A method according to claim 1 in which the crumbly yeast fed into the mill has a dry matter content of from 30 to 40%.

5. A method according to claim 1 in which the yeast carried out of the mill has a particle size substantially entirely in the range 0.1 to 1 millimeter.

6. A method according to claim 1 in which the yeast carried out from the mill occupies a volume per unit weight at least 2.7 times the volume per unit weight of a compressed cake of the same yeast.

7. A method according to claim 1 in which the drying is conducted by tray drying, the yeast being substantially undisturbed in the trays at least until the dry matter content exceeds 75%.

8. A method according to claim 1 in which after the drying the dried powder is sieved to remove any particles above 0.5 mm. in diameter.

9. A method according to claim 1 in which after the drying the dried powder is sieved to remove any particles above 0.35 mm. in diameter.

10. A method of making a dough comprising dry mixing flour and an active dried yeast obtained by a method according to claim 1 and then adding water to form the dough.

11. A method of making a baked product comprising dry mixing flour and an active dried yeast obtained by a method according to claim 1, adding water to form a dough and then baking the dough.

References Cited

UNITED STATES PATENTS

| 1,420,558 | 6/1922 | Klein | 195—98 |
| 1,694,807 | 12/1928 | Brown | 195—98 X |
| 2,919,194 | 12/1959 | Johnston | 99—96 |
| 1,420,630 | 6/1922 | Hixson | 99—96 X |

DAVID M. NAFF, Primary Examiner

U.S. Cl. X.R.

195—98; 426—473